US007020195B1

(12) United States Patent
McMahon

(10) Patent No.: US 7,020,195 B1
(45) Date of Patent: Mar. 28, 2006

(54) LAYERED CODING AND DECODING OF IMAGE DATA

(75) Inventor: Thomas L. McMahon, Playa Del Rey, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/458,300

(22) Filed: Dec. 10, 1999

(51) Int. Cl.
*H04N 7/12* (2006.01)

(52) U.S. Cl. .................................. 375/240.11
(58) Field of Classification Search ............. 348/399,
348/400–409, 415, 420, 397, 398, 554, 558;
375/240.11, 240.25, 240.28, 240.03, 240.19,
375/240.01, 240.16; 382/240
See application file for complete search history.

(56) References Cited

U.S. PATENT DOCUMENTS

| 4,780,760 | A | | 10/1988 | Waldman et al. ............ 358/105 |
| 5,235,420 | A | * | 8/1993 | Gharavi ...................... 358/136 |
| 5,253,058 | A | * | 10/1993 | Gharavi ................... 375/240.12 |
| 5,510,787 | A | * | 4/1996 | Koster .......................... 341/76 |
| 5,832,124 | A | * | 11/1998 | Sato et al. .................. 382/238 |
| 6,025,927 | A | * | 2/2000 | Honma ....................... 358/1.18 |
| 6,061,719 | A | * | 5/2000 | Bendinelli et al. ........... 709/218 |
| 6,148,030 | A | * | 11/2000 | Katata et al. ............. 375/240.1 |
| 6,173,013 | B1 | * | 1/2001 | Suzuki et al. ........... 375/240.16 |
| 6,317,171 | B1 | * | 11/2001 | Dewald ....................... 348/756 |
| 6,414,991 | B1 | * | 7/2002 | Yagasaki et al. ........ 375/240.12 |
| 6,553,072 | B1 | * | 4/2003 | Chiang et al. .......... 375/240.25 |
| 2002/0021412 | A1 | * | 2/2002 | Goodhill et al. .............. 352/27 |
| 2004/0150747 | A1 | * | 8/2004 | Sita ............................ 348/558 |

OTHER PUBLICATIONS

Morrison et al, Two-layer video coding for ATM networks, 1991, Elsevier Science Publishers, 179-195.*

\* cited by examiner

*Primary Examiner*—Vu Le
*Assistant Examiner*—Behrooz Senfi
(74) *Attorney, Agent, or Firm*—Lee & Hayes, PLLC

(57) ABSTRACT

An image processing system generates a base layer that represents a low-resolution portion of a source image. The image processing system also generates an enhancement layer that represents a high-resolution portion of the source image. The base layer has an associated aspect ratio and the enhancement layer has an associated aspect ratio that differs from the aspect ratio associated with the base layer. The aspect ratio associated with the base layer corresponds to an aspect ratio associated with low-resolution televisions. The aspect ratio associated with the enhancement layer corresponds to an aspect ratio associated with high-resolution televisions. The base layer can be generated by low-pass filtering the source image and the enhancement layer can be generated by high-pass filtering the source image. The base layer can also be generated by subtracting a portion of the base layer from a corresponding portion of the source image. An image decoding system is used to identify the base layer and the enhancement layer from a transport stream and recreate the source image.

76 Claims, 13 Drawing Sheets

LAYERED CODING AND DECODING OF IMAGE DATA

TECHNICAL FIELD

This invention relates to image processing systems. More particularly, the invention relates to systems that process images using a layered coding technique in which each layer has a different aspect ratio.

BACKGROUND

Until recently, nearly all television receivers were manufactured having a 4:3 aspect ratio; i.e., the ratio of the width of the television screen to the height of the television screen is approximately 4:3. Television receivers have this 4:3 aspect ratio because until recently existing television broadcast standards, such as NTSC (National Television Standards Committee) and PAL (Phase Alternating Line), provided for the production and broadcast of television programming in the 4:3 aspect ratio.

In recent years, television manufacturers have began producing television receivers, video projectors, and flat panel displays having a wider 16:9 aspect ratio in anticipation of new television broadcast standards. Currently, only a small amount of television programming is produced in the 16:9 aspect ratio, although television programming is expected to eventually be produced entirely (or at least substantially) in the 16:9 aspect ratio. The new digital television standard (HDTV—High-Definition Television) will typically capture and store television program content using a 16:9 aspect ratio instead of the 4:3 aspect ratio supported by millions of existing television receivers. To avoid obsoleting 4:3 aspect ratio televisions, systems will be required to convert or modify HDTV signals to allow reception and display of the new signals by televisions having a 4:3 aspect ratio.

FIG. 1 illustrates a conventional digital broadcast system for producing and distributing television programs. The programming content is captured using a video camera 10 that transfers the captured images onto video tape or another storage medium. Alternatively, programming content may be captured using a film telecine, a device that scans and digitizes film images. Later, the captured images are edited into one or more television programs using a video editor 12. A video compressor 14 compresses the television program content to reduce the transmission bandwidth and/or transmission speed required to transmit the television program. Various compression techniques may be used to compress the television program, such as the MPEG-2 (Moving Picture Experts Group) compression algorithm.

The compressed television program is provided to a transmitter 16, which transmits the program to multiple receivers 18 across a communication link 20. Communication link 20 may be, for example, a physical cable, a satellite link, a terrestrial broadcast, an Internet connection, a physical medium (such as a digital video disc (DVD)) or a combination thereof. A decompressor 22 decompresses the signal received by receiver 18 using the appropriate decompression technique. The decompressed television program signal is then displayed on television display 24. Receiver 18 may be a separate component (such as a cable television box) or may be integrated into television display 24. Similarly, decompressor 22 may be a separate component or may be integrated into the receiver or the television display.

FIG. 2 illustrates a conventional layered encoding system that separates a high-resolution image (e.g., an image captured by video camera 10 in FIG. 1 or a film telecine) into multiple layers. This layered encoding system can be used to "bridge" the transition from older low-resolution 4:3 aspect ratio televisions to the newer high-resolution 16:9 aspect ratio televisions. Rather than requiring replacement of over 300 million 4:3 aspect ratio televisions, the layered encoding system separates the high-resolution image into a low-resolution layer (referred to as the "base layer") and a high-resolution layer (referred to as the "enhancement layer"). The base layer is used by existing low-resolution 4:3 aspect ratio televisions that cannot utilize the higher resolution portions of the image contained in the enhancement layer. Thus, 4:3 aspect ratio televisions can continue to display television programs distributed in the new high-resolution format. High-resolution televisions, such as HDTVs, use both the base layer and the enhancement layer to generate a high-resolution image on the television.

In FIG. 2, a high-resolution source image 30 is separated into a base layer 32 and an enhancement layer 34. The base layer 32 contains information used by all television systems (i.e., both high-resolution and low-resolution television systems). Images produced from the base layer 32 alone are typically comparable in quality to existing low-resolution television images distributed to low-resolution television systems today. The enhancement layer 34 enhances the base layer 32 to provide a high-resolution image. Thus, the enhancement layer 34 is not used by low-resolution television systems.

The enhancement layer 34 is compressed by a compressor 36 and the base layer 32 is compressed by a compressor 38. Each compressor 36 and 38 communicates its compressed data to a transmitter 40 for transmission to one or more television receivers. In the example of FIG. 2, the high-resolution source image 30 is captured by the video camera in a 4:3 aspect ratio. Both the base layer 32 and the enhancement layer 34 also have a 4:3 aspect ratio. Since the source image has a 4:3 aspect ratio, the procedures and/or components that separate out the base layer and the enhancement layer inherently maintain the same aspect ratio for the base layer and the enhancement layer.

The 4:3 aspect ratio base layer 32 is easily processed by a low-resolution television system, because the television system has the same aspect ratio. However, when the 4:3 aspect ratio layers (base layer 32 and enhancement layer 34) are processed by a 16:9 aspect ratio high-resolution display system, the 4:3 image does not properly fit on the 16:9 television screen. Although most high-resolution televisions are being manufactured in the 16:9 aspect ratio, electronic imagery continues to capture images in a 4:3 aspect ratio. Thus, the source image aspect ratio may differ from the high-resolution display aspect ratio.

FIGS. 3A and 3B illustrate two possible methods for displaying an image having a 4:3 aspect ratio on a display having a 16:9 aspect ratio. In FIG. 3A, a 16:9 television screen 100 is not completely filled by the 4:3 image (located between the broken lines). Thus, blank side bars 102 are located on opposite sides of the screen 100. Although the entire 4:3 image is displayed on the 16:9 screen, irregular screen usage results from this arrangement. The two side bars 102 are typically black because that portion of screen 100 is not activated. Therefore, the screen is not utilized in a uniform manner. This irregular activation of the screen may cause a television with a tube screen to "wear" unevenly. For example, the phosphor coating in the middle portion of the screen is regularly activated by the 4:3 image, but the phosphor coating on the two side bars 102 is not activated. When a 16:9 image is displayed on the "worn"

screen, the two side bars will be noticeable due to different brightness or contrast between the two side bars and the middle portion of the screen. This type of irregularity permanently diminishes the user's viewing experience.

Another alternative for displaying a 4:3 image on a 16:9 screen is shown in FIG. 3B. In this situation, the width of the 4:3 image is expanded to align with the sides of the 16:9 screen 100. However, this expansion causes the top and bottom portions of the image to extend past the physical limits of the screen 100. Thus, top and bottom portions 110 of the image are not displayed on the screen 100. This arrangement is problematic because portions of the image that were intended to be seen are not visible. For example, the tops of actors' heads may be deleted, resulting in an unnatural appearance. Additionally, any footer information displayed along the bottom of the 4:3 image (e.g., stock tickers, sports scores, etc.) may not be displayed on the screen 100. Thus, neither method for displaying a 4:3 image on a 16:9 display provides a high-quality, problem-free image.

As more 16:9 high-resolution televisions are installed, video cameras are likely to begin transitioning to capture images in the same 16:9 aspect ratio. In this situation, the source image aspect ratio matches the display aspect ratio, thereby eliminating the problems discussed above with respect to FIGS. 3A and 3B. However, the use of 16:9 video cameras creates another problem: the 16:9 image does not properly fit in the existing low-resolution televisions having a 4:3 aspect ratio. When using a 16:9 video camera, the source image has a 16:9 aspect ratio and both the base layer and the enhancement layer also have a 16:9 aspect ratio.

FIGS. 4A, 4B and 4C illustrate methods for displaying an image having a 16:9 aspect ratio on a display having a 4:3 aspect ratio. In FIG. 4A, a television screen 120 has a 4:3 aspect ratio. The 16:9 image 122 is positioned between the two broken lines. Since the aspect ratio of the image is different from the aspect ratio of the screen 120, two blank bars 124 are created across the top and bottom of the screen. These two blank bars 124 may cause screen "wear" problems similar to those caused by the two side bars 102 discussed above with respect to FIG. 3A. The display format shown in FIG. 4A is commonly referred to as "letterboxing."

In FIG. 4B, the height of the 16:9 image is expanded to align with the top and bottom edges of the 4:3 screen 120. However, this expansion causes the sides of the image to extend past the physical limits of the screen 120. Thus, side portions 130 of the image are not displayed on the screen 120. This arrangement is undesirable because portions of the image that the creator (or editor) intended to be seen by the viewer are not visible. The display format shown in FIG. 4B is commonly referred to as "overscanning."

In FIG. 4C, a 16:9 image is fit onto a 4:3 aspect ratio screen by using an "anamorphic squeeze" procedure. The anamorphic squeeze procedure laterally (i.e., horizontally) compresses the image, but maintains the top and bottom edges of the image aligned with the 4:3 screen. This lateral compression of the 16:9 image causes some distortion because the image is compressed horizontally, but is not compressed vertically. In the example of FIG. 4C, the original 16:9 image is wider than the 4:3 screen 120, leaving side portions 130 that are not displayed. The anamorphic squeeze procedure compresses the 16:9 image horizontally until the two sides of the 16:9 image align with the sides of screen 120, thereby eliminating side portions 130. A resulting anamorphically squeezed image 132 is displayed on screen 120 without deleting any portion of the image. However, as mentioned above, the image is distorted due to the horizontal compression without any corresponding vertical compression.

Thus, the common aspect ratio for both the base layer and the enhancement layer presents display problems because the aspect ratio of at least one of the layers will not match the aspect ratio of the television on which the layer is to be displayed. The present invention addresses these disadvantages, providing improved coding and decoding of layered image data.

SUMMARY

The present invention provides a layered encoding system that separates a high-resolution source image into a base layer and an enhancement layer, in which each layer has a different aspect ratio. The invention enables transmission of the base layer at an aspect ratio that is different from the aspect ratio of the enhancement layer. In one embodiment of the invention, the base layer has a 4:3 aspect ratio, which matches the aspect ratio of low-resolution television systems. Similarly, the enhancement layer has a 16:9 aspect ratio, which matches the aspect ratio of high-resolution television systems. Thus, the appropriate aspect ratio is provided for both low- and high-resolution television systems. This helps ease the transition to high-resolution television systems (such as HDTV) by continuing to support the hundreds of millions of existing low-resolution televisions, while simultaneously supporting the new HDTV standard on high-resolution television systems having a 16:9 aspect ratio.

One embodiment of the invention generates a base layer that represents a low-resolution portion of a source image. In this embodiment, the base layer has a 4:3 aspect ratio. An enhancement layer is also generated that represents a high-resolution portion of the source image. The enhancement layer is generated to have a 16:9 aspect ratio.

An implementation of the invention generates the base layer by low-pass filtering the source image.

In a described implementation of the invention, the enhancement layer is generated by subtracting a portion of the base layer from a corresponding portion of the source image.

Another implementation of the invention generates the enhancement layer by high-pass filtering the source image.

In accordance with another aspect of the invention, the base layer and the enhancement layer are combined into a single transport stream.

Other aspects of the invention provide for the transmission of the base layer and/or the enhancement layer to one or more image decoding systems.

Another implementation of the invention provides an image decoding system that decodes the base layer and the enhancement layer from a transport stream and recreates the source image on a low-resolution television system or a high-resolution television system.

DETAILED DESCRIPTION

The present invention provides a layered encoding system that separates a high-resolution source image into a base layer having an aspect ratio similar to that of typical low-resolution television systems and an enhancement layer having an aspect ratio similar to the aspect ratio of high-resolution television systems. In a particular embodiment of the invention, the base layer has a 4:3 aspect ratio and the enhancement layer has a 16:9 aspect ratio. This layered encoding system helps "bridge" the transition from low-resolution 4:3 aspect ratio televisions to high-resolution 16:9 aspect ratio televisions by supporting both types of televisions simultaneously. Although particular aspect ratios are discussed herein by way of example, it is to be understood that the invention can be applied to any combination of aspect ratios.

As used herein, the terms "television", "television system", and "television receiver" shall be understood to include televisions, video projectors, flat panel displays, and related display systems. Additionally, the term "video" includes any form of electronic imagery, such as film or digitized image sequences.

Figure 5:
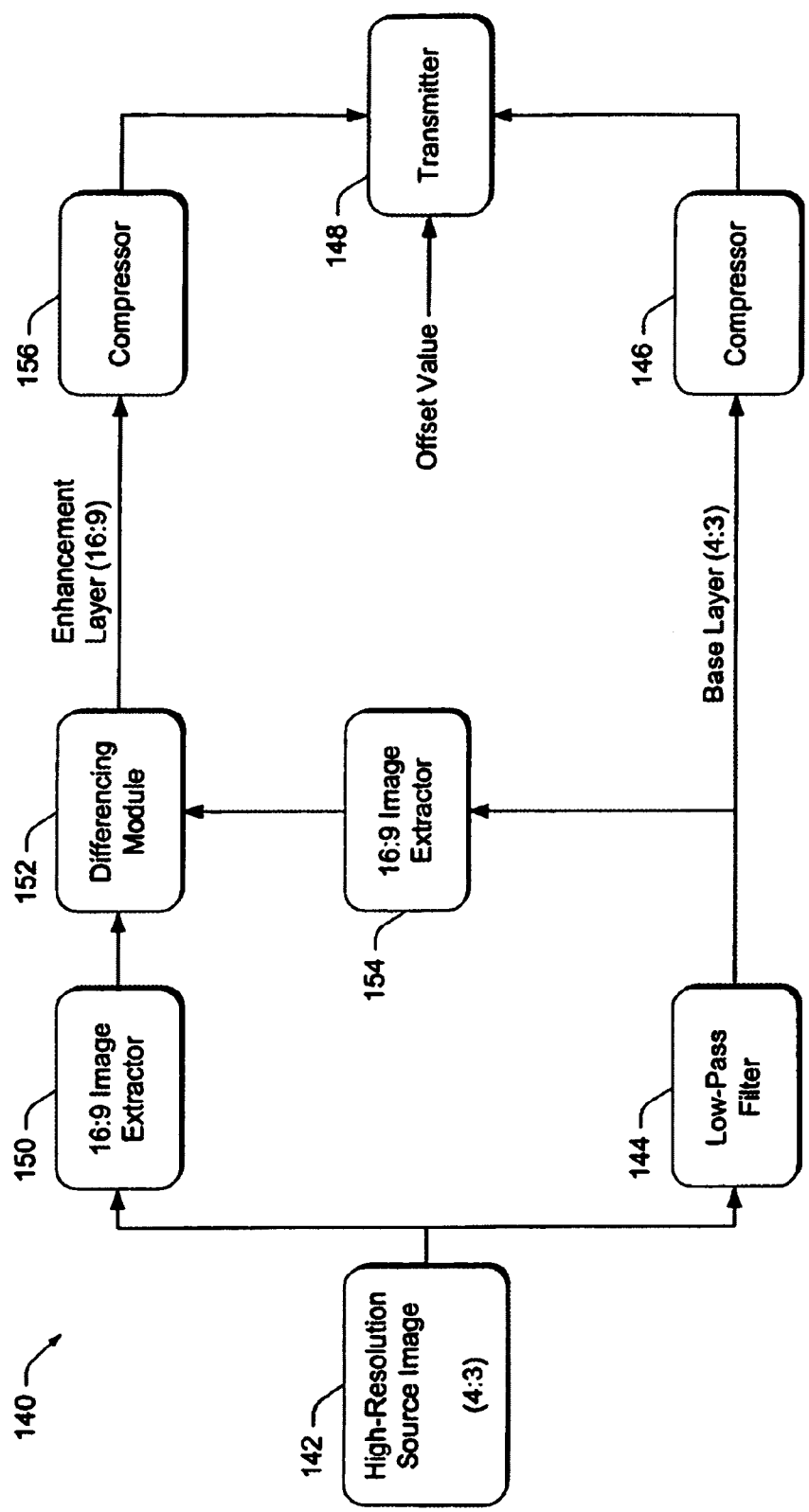
FIG. 5 illustrates an embodiment of a layered encoding system that separates a 4:3 high-resolution image into a base layer having a 4:3 aspect ratio and an enhancement layer having a 16:9 aspect ratio.

FIG. 5 illustrates an embodiment of a layered encoding system 140 that separates a 4:3 high-resolution image into a base layer having a 4:3 aspect ratio and an enhancement layer having a 16:9 aspect ratio. A layered encoding system may also be referred to as an image encoding system. A high-resolution source image 142 is captured using a video camera, a film telecine or other device capable of capturing an image. A series of successive source images are captured to generate a program (e.g., a television program or a movie). In this embodiment, the source image 142 has a 4:3 aspect ratio. The high-resolution source image 142 is communicated to a low-pass filter 144 and a 16:9 image extractor 150. Low-pass filter 144 filters out the high-resolution portions of the source image 142, thereby leaving only the low-resolution portions of the image, which is referred to as the "base layer." The base layer has the same aspect ratio (4:3) as the source image 142.

The low-pass filter 144 is coupled to a compressor 146, which compresses the base layer to reduce the transmission speed and/or transmission bandwidth required to transmit the base layer information. In a particular embodiment of the invention, compressor 146 compresses the base layer using the MPEG-2 compression algorithm. MPEG-2 is used as the compression algorithm to maintain backward compatibility with existing MPEG-2 decoders in low-resolution television systems. The compressor 146 is coupled to a transmitter 148, which transmits the compressed base layer information to one or more receiving devices. Transmitter 148 transmits signals using one or more communication mechanisms, such as broadcasting the signals via satellite, via cable television connections, via terrestrial broadcast, via the Internet (e.g., as an Internet television broadcast), or via a physical medium. Although not shown in FIG. 5, transmitter 148 multiplexes the compressed base layer and the compressed enhancement layer prior to transmission. Header information is added to indicate whether the attached data is part of the compressed base layer or part of the compressed enhancement layer. Additionally, the offset value can be multiplexed with the compressed base layer and the compressed enhancement layer.

Figure 6A:
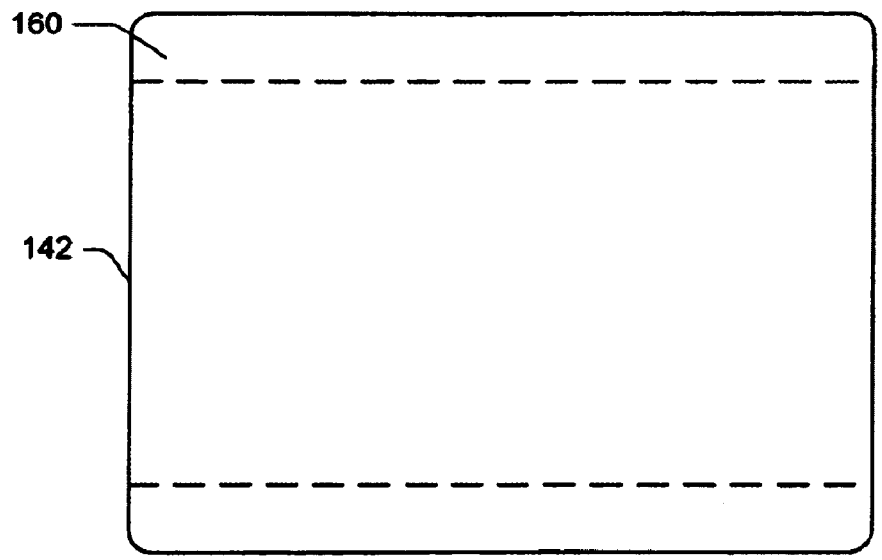
FIGS. 6A and 6B illustrate different vertical offset values that are used when extracting an image having a 16:9 aspect ratio from a source image having a 4:3 aspect ratio.
Figure 6B:
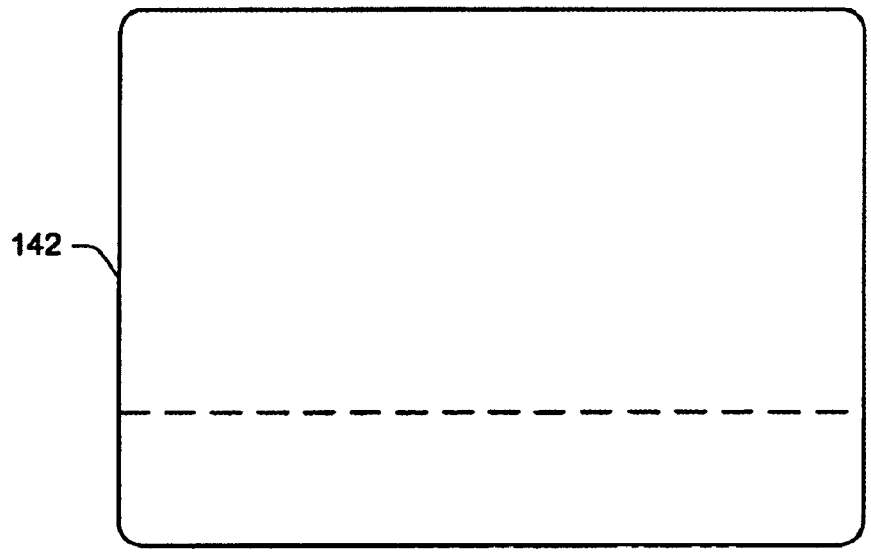

As mentioned above, the source image 142 is also provided to the 16:9 image extractor 150, which extracts a high-resolution 16:9 image from the high-resolution source image 142. To properly extract the 16:9 image, extractor 150 uses an offset value to determine the location, within the source image 142, from which the 16:9 image is extracted. FIGS. 6A and 6B illustrate different vertical offset values used when extracting an image having a 16:9 aspect ratio from a source image having a 4:3 aspect ratio. In both examples, the left and right sides of the extracted image align with the two sides of the source image 142. In FIG. 6A, a 16:9 image extracted from the middle of source image 142 (i.e., the portion of the image between the two broken lines). In the example of FIG. 6A, an offset value 160 is set such that the extracted image is centered vertically within the source image 142. In FIG. 6B, an image is extracted from the top of the source image 142 (i.e., the portion of the image above the broken line). In the example of FIG. 6B, the vertical offset value is zero because the top of the extracted image aligns with the top of the source image 142.

Referring again to FIG. 5, extractor 150 is coupled to a differencing module 152 which receives the high-resolution 16:9 image extracted by extractor 150. Differencing module 152 is coupled to another 16:9 image extractor 154. Extractor 154 extracts a low-resolution 16:9 image from the base layer using the same vertical offset value used by extractor 150. By using the same vertical offset value, the same portion of each image is extracted by extractor 150 and extractor 154. Although not shown, a horizontal offset value may also be used to determine the horizontal offset of the image from the left or right edge of the source image. The horizontal offset value can be used instead of or in addition to the vertical offset value.

The image extracted by extractor 154 is a low-resolution image because the image is extracted from the base layer, which is a low-resolution version of the source image 142. The image extracted by extractor 150 is a high-resolution image extracted directly from the source image 142. The differencing module 152 determines the differences between the low-resolution 16:9 image received from extractor 154 and the high-resolution 16:9 image received from extractor 150. The difference between the two 16:9 images can be determined, for example, by subtracting the low-resolution 16:9 image from the high-resolution 16:9 image. The difference between the two 16:9 images is the enhancement layer (i.e., only the high-resolution portions of the source image, such as the sharp edges and the portions of the image with bright color or high contrast). The enhancement layer does not contain any of the low resolution portions of the source image. Thus, the enhancement layer can subsequently be used in combination with the base layer to recreate the original high-resolution source image 142.

In an alternate embodiment of the invention, the enhancement layer is generated by applying a high-pass filter to a 16:9 image extracted from the high-resolution source image 142. The high-pass filter blocks the low-resolution portions of the source image and passes the high-resolution portions of the source image. These high-resolution portions of the source image that pass through the high-pass filter represent the enhancement layer.

A compressor 156 is coupled to differencing module 152. The compressor 156 receives and compresses the enhancement layer to reduce the transmission speed and/or transmission bandwidth required to transmit the enhancement layer information. In one embodiment of the invention, compressor 156 compresses the enhancement layer using the MPEG-2 compression algorithm. However, compressor 156 is not required to use the same compression algorithm as compressor 146, discussed above. For example, compressor 156 may use a compression algorithm that utilizes three-dimensional wavelets to compress the enhancement layer information. The compressor 156 is coupled to the transmitter 148, which transmits the compressed enhancement layer information to one or more receiving devices. Transmitter 148 also receives an offset value that is transmitted along with the base layer and the enhancement layer. This offset value is the same as the offset value used by extractors 150 and 154. The offset value is required by the receiving devices to properly decode and recreate the original high-resolution source image 142. The offset value may be communicated as a separate data stream along with the base and enhancement layers. Alternatively, the offset value may be incorporated into the enhancement layer data stream by compressor 156. In a particular implementation, transmitter 148 combines the base layer, the enhancement layer, and the offset value into a single transport stream that is transmitted to one or more image decoding systems.

When generating a transport stream, header information, such as a Program ID (PID), is added to the transport stream to identify the data elements (e.g., data packets) contained in the stream. For example, the header information can identify the base layer, the enhancement layer, the offset value, and other information such as a program guide or advertisements. This header information is used by an image decoding system to properly decode the transport stream.

Although the base layer and the enhancement layer can be transmitted as a single transport stream, the two layers may also be transmitted as different streams, transmitted at different times, transmitted across different media, and transmitted using different transmission formats. For example, the base layer may be transmitted at a particular time using a satellite broadcast system and a transmission format appropriate for the satellite system. The enhancement layer can be transmitted at a later time using an Internet distribution system and a transmission format appropriate for the distribution of information across the Internet.

In another embodiment of the invention, compressors 146 and 156 are coupled to a recording device(s) that stores the base layer, the enhancement layer, and the offset value on a storage medium for future retrieval. For example, the storage medium may be a DVD (Digital Versatile Disc or Digital Video Disc), a laser disc, a video tape, a magnetic or optical disk drive, a memory device, etc. The base layer, enhancement layer, and the offset value are not necessarily stored on the same storage medium. For example, the base layer information may be stored on a DVD or other physical medium that is distributed to consumers. Consumers having a low-resolution television system do not need the enhancement layer or the offset information and, therefore, only require the DVD containing the base layer information. Customers having a high-resolution television system may, for example, download the enhancement layer and the offset value across the Internet and store the information on a local disk drive. When the customer is ready to view the television program, the customer's high-resolution television system retrieves the base layer from the DVD and retrieves the enhancement layer and the offset value from the disk drive.

Although not shown in FIG. 5, other storage devices may be used to store configuration information (such as the offset value) or intermediate calculations. These storage devices may include volatile as well as non-volatile storage devices.

Various embodiments of the invention described herein include one or more compressors (e.g., compressors 146 and 156 shown in FIG. 5). However, all compressors described herein are optional (i.e., they are not required to practice the invention).

Figure 7:
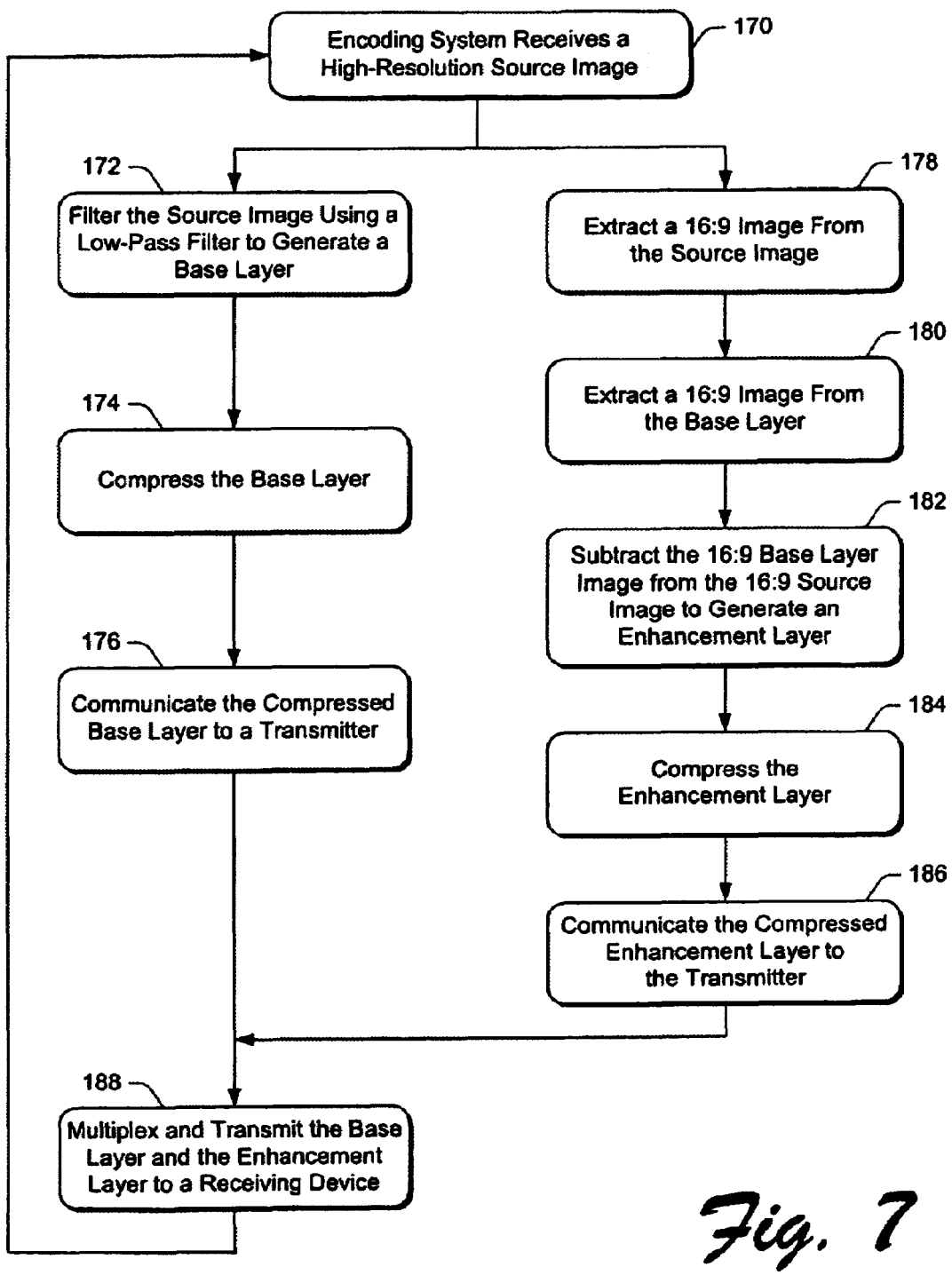
FIG. 7 is a flow diagram illustrating a layered encoding procedure.

FIG. 7 is a flow diagram illustrating a layered encoding procedure using, for example, the layered encoding system 140 described above with respect to FIG. 5. The encoding system receives a series of high-resolution source images. Each source image is processed using the procedure of FIG. 7. The encoding system receives a high-resolution source image, such as from a video camera, a film telecine or a video editing system (step 170). The flow diagram branches from step 170 into two parallel paths that are processed concurrently. Following the left path of FIG. 7, the source image is filtered using a low-pass filter to generate a base layer (step 172). The base layer is then compressed (step 174) and communicated to a transmitter (step 176).

Following the right path of FIG. 7, a 16:9 image is extracted from the high-resolution source image (step 178). Another 16:9 image is extracted from the low-resolution base layer (step 180). The 16:9 image from the base layer is subtracted from the 16:9 image from the source image to generate an enhancement layer (step 182). The enhancement layer is then compressed (step 184) and communicated to a transmitter (step 186). The left and right paths of FIG. 7 converge at step 188, which multiplexes and transmits the base layer and the enhancement layer to a receiving device. As discussed above, the transmitter may also transmit an offset value along with the base layer and the enhancement layer in a single transport stream.

In a particular implementation of the invention, the encoding system asks the recipient of the transport stream whether they want to view the program in a low-resolution mode or a high-resolution mode. This type of system is useful, for example, when ordering a pay-per-view program. If the recipient selects the low-resolution mode, then the transport stream only contains the base layer and associated control information. The enhancement layer and the offset value are not required to view a low-resolution image, so they are not included in the transport stream. However, if the recipient selects the high-resolution mode, then the base layer, the enhancement layer, and the offset value are all included in the transport stream. The transport stream is then transmitted to the recipient (e.g., via satellite, cable, or the Internet). In another implementation, a set top box (or similar device) instructs a service provider to provide a particular level (or quality) of video.

Figure 8:
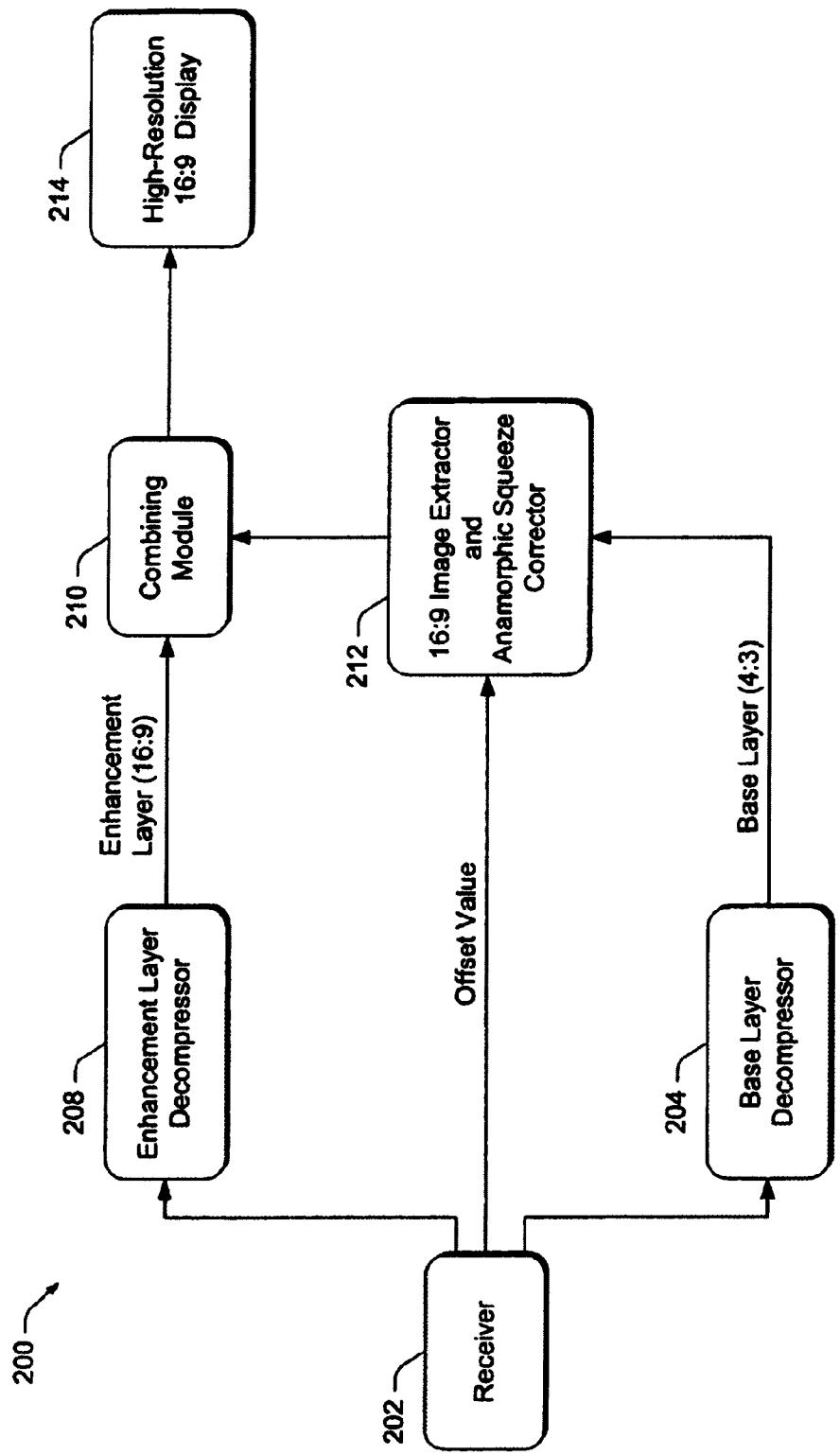
FIG. 8 illustrates an embodiment of a layered decoding system that generates a high-resolution 16:9 image from a base layer having a 4:3 aspect ratio and an enhancement layer having a 16:9 aspect ratio.

FIG. 8 illustrates an embodiment of a layered decoding system 200 capable of generating a high-resolution 16:9 image from a base layer having a 4:3 aspect ratio and an enhancement layer having a 16:9 aspect ratio. A layered decoding system may also be referred to as an image decoding system. The layered decoding system 200 may be a separate component (e.g., a set top box) or may be integrated into a television or another television system component (e.g., a cable television box or a satellite receiver). Alternatively, the layered decoding system 200 may be implemented using a personal computer.

A receiver 202 receives a stream of data that typically includes a base layer, an enhancement layer, and an offset value. Typically, the base layer and the enhancement layer are multiplexed together. The received data stream includes header information that identifies the data elements (e.g., data packets) contained in the data stream. For example, the header information can identify the base layer, the enhancement layer, the offset value, and other information such as a program guide or advertisements. This header information allows the receiver 202 to separate (or demultiplex) the various elements in the data stream.

Receiver 202 is coupled to a base layer decompressor 204, which receives the base layer information from the receiver 202. Decompressor 204 decompresses the base layer information using, for example, an MPEG-2 decoding algorithm. Decompressor 204 is coupled to a 16:9 image extractor (and anamorphic squeeze corrector) 212 (discussed below). In the example of FIG. 8, if the data stream is being decoded for viewing on a low resolution 4:3 display, only the base layer is required. Thus, only the receiver 202 and the decompressor 204 are required to generate a low-resolution image on a low-resolution display.

Receiver 202 is also coupled to an enhancement layer decompressor 208, which decompresses the enhancement layer information received from the receiver 202. Decompressor 208 decompresses the enhancement layer information using a decoding algorithm of the same type as the encoding algorithm used to encode the data (e.g., MPEG-2). Decompressor 208 is coupled to a combining module 210, which receives the decompressed enhancement layer from the decompressor 208. Combining module 210 is also coupled to the 16:9 image extractor and anamorphic squeeze corrector 212, which generates a low-resolution 16:9 image from the base layer. If the base layer is letterboxed, extractor/corrector 212 also receives a vertical offset value from the receiver 202 indicating the location of the 16:9 image within the base layer. This vertical offset value is the same value used by the encoding system 140 to generate the enhancement layer. Alternatively, the vertical offset value may be determined automatically by image extractor 212 by locating the image data in the data stream and determining the offset of the image. Combining module 210 combines the 16:9 image generated from the base layer with the enhancement layer to generate a high-resolution 16:9 image. The high-resolution 16:9 image is displayed on a high-resolution 16:9 display 214 coupled to the combining module 210.

In an alternate embodiment, if the base layer is transmitted with an anamorphic squeeze, the extractor/corrector 212 receives or automatically generates an anamorphic squeeze parameter which is applied to the decompressed base layer to correct the aspect ratio of the base layer prior to combining with the decompressed enhancement data. The anamorphic squeeze corrector laterally expands the squeezed image to restore the original 16:9 aspect ratio of the image.

In an alternate embodiment of the invention, the combining module 210 stores the high-resolution 16:9 image on a storage device for future retrieval and viewing. The storage device may include, for example, a video tape recorder or a disk drive.

Figure 9:
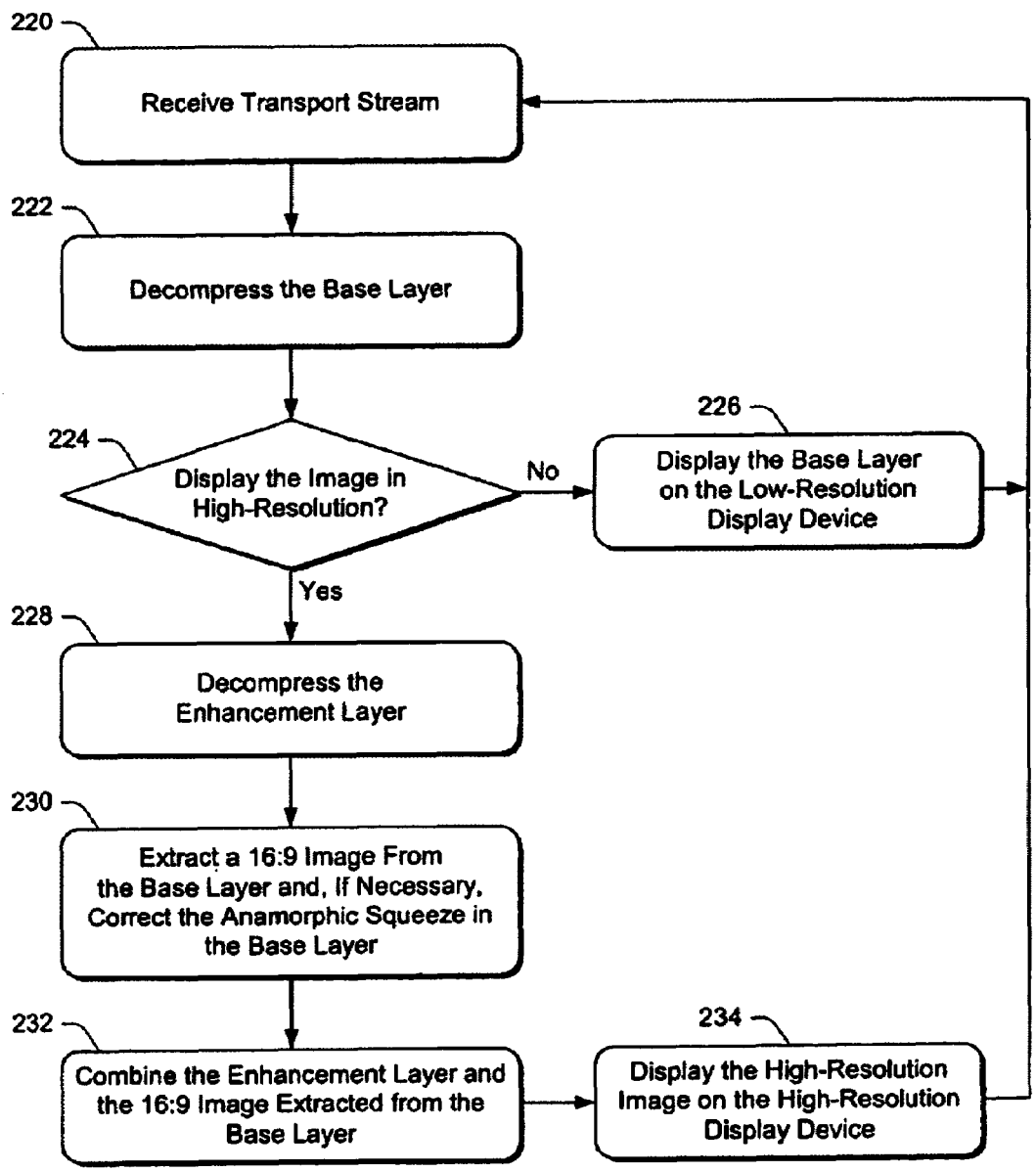
FIG. 9 is a flow diagram illustrating a layered decoding procedure.

FIG. 9 is a flow diagram illustrating a layered decoding procedure using, for example, the layered decoding system 200 described above with respect to FIG. 8. The decoding system receives a transport stream containing the base layer, the enhancement layer, and the offset value (step 220). The base layer information in the received transport stream is decompressed (step 222). The procedure then determines whether the image being decoded will be displayed on a high-resolution display or a low-resolution display (step 224). If the image will be displayed on a low-resolution display, then the decompressed base layer information is provided to the low-resolution display (step 226). Since the enhancement layer and the offset value are not required to display a low-resolution image, the procedure returns to step 220 to continue processing the transport stream.

If the image will be displayed on a high-resolution display, then the enhancement layer information in the received transport stream is decompressed (step 228). The procedure then extracts a 16:9 image from the decompressed base layer (step 230). Alternatively, if the base layer was transmitted with an anamorphic squeeze, then the procedure corrects the anamorphic squeeze in the base layer by laterally expanding the aspect ratio of the base layer image to 16:9.

The decompressed enhancement layer is combined with the 16:9 image from the decompressed base layer to generate a high-resolution image (step 232). The high-resolution image is then displayed on the high-resolution display device (step 234). After displaying the high-resolution image, the procedure returns to step 220 to continue processing the transport stream.

In an alternate embodiment of the invention, the use of the vertical offset value can be eliminated with the standardization of the location, within the source image, from which the 16:9 image is extracted. For example, the standardized location for extracting the 16:9 image may be the middle of the source image (FIG. 6A) or the top of the source image (FIG. 6B). In an alternate embodiment, the use of an anamorphic correction factor can be eliminated with the standardization of the use of the industry standard 4:3 and 16:9 aspect ratios.

Figure 1:
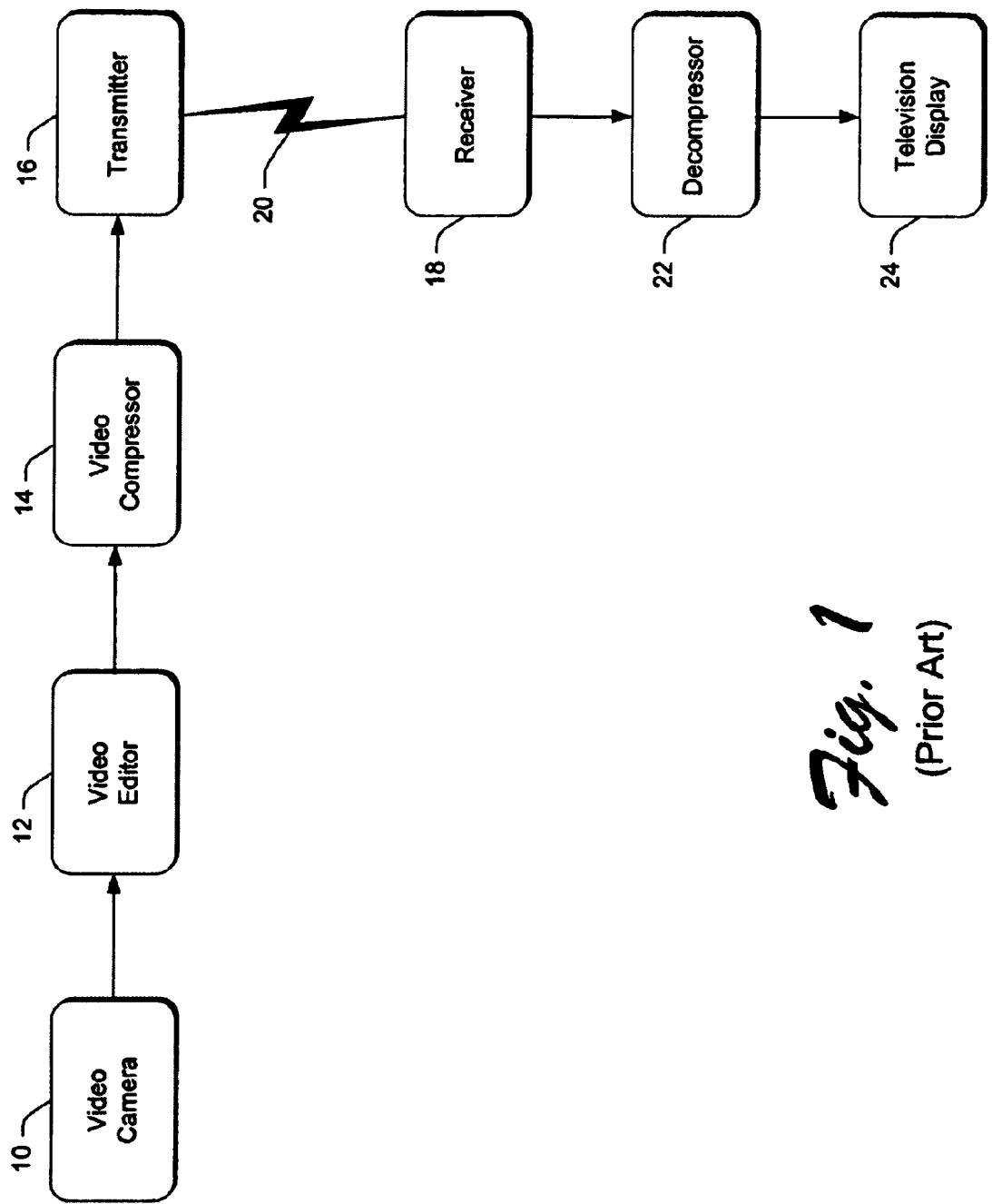
FIG. 1 illustrates a conventional digital broadcast system for distributing television programs.
Figure 2:
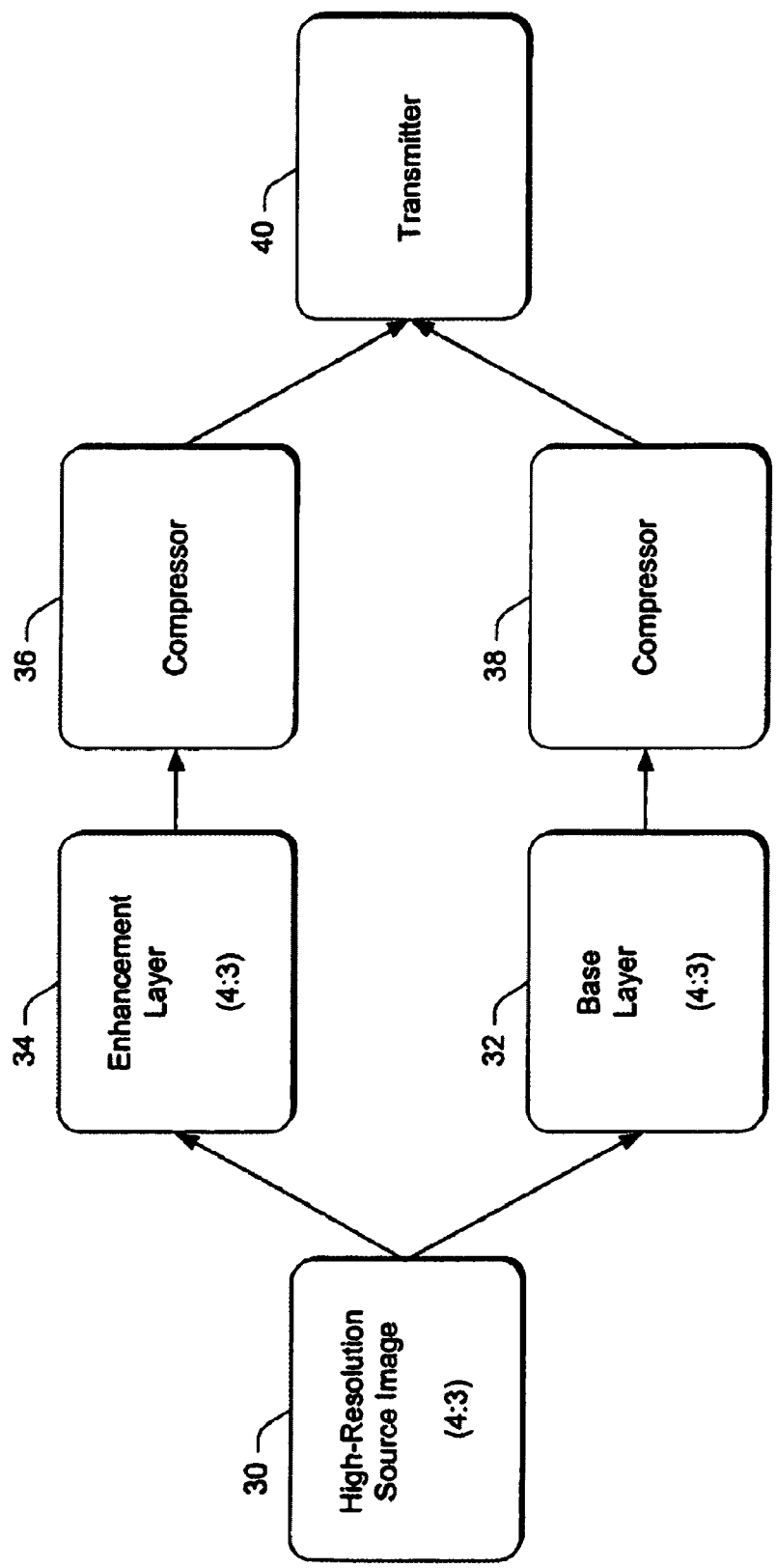
FIG. 2 illustrates a conventional layered encoding system that separates a high-resolution image into a base layer and an enhancement layer.
Figure 3A:
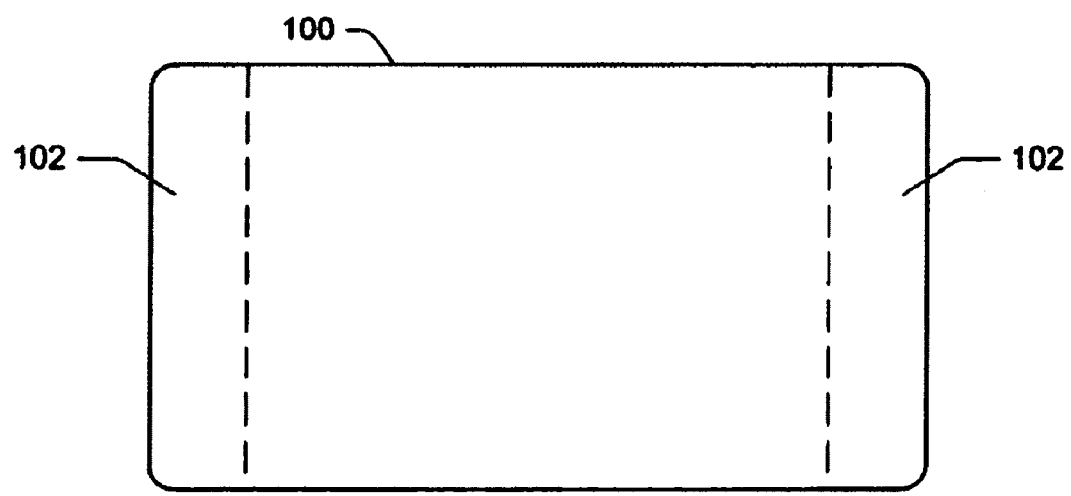
FIGS. 3A and 3B illustrate methods for displaying an image having a 4:3 aspect ratio on a display having a 16:9 aspect ratio.
Figure 3B:
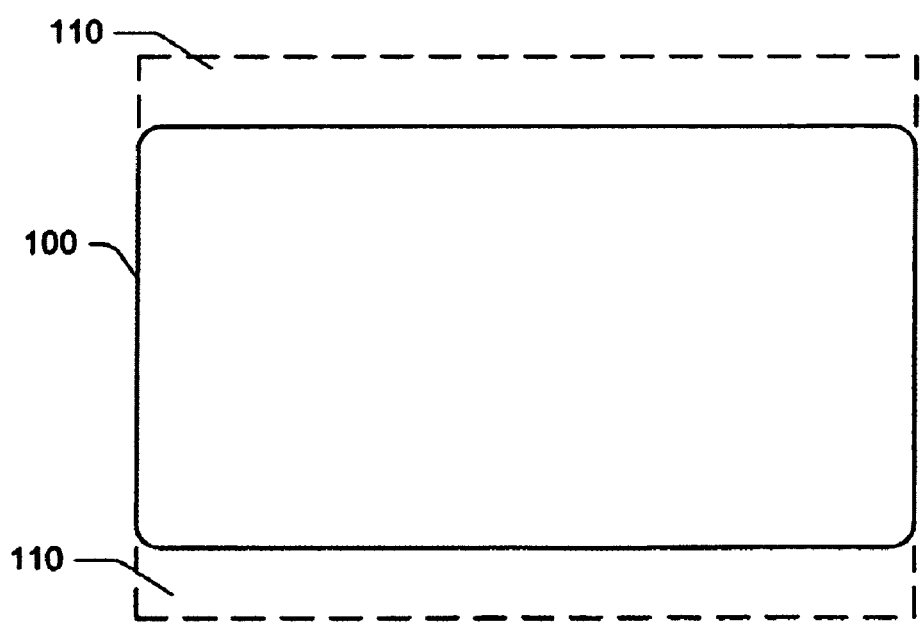
Figure 4A:
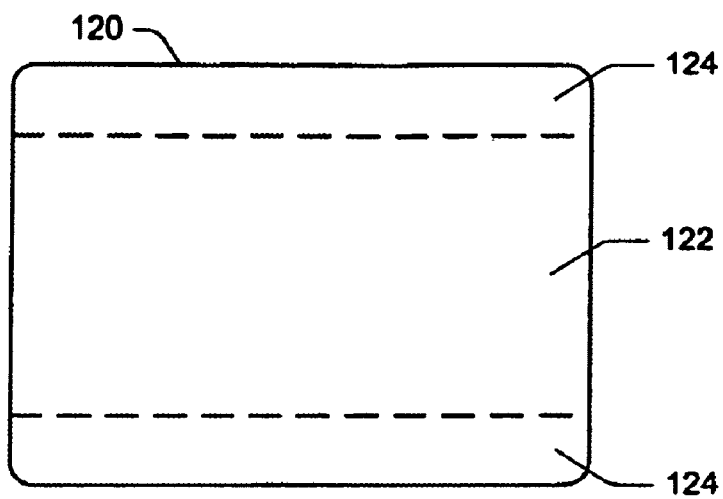
FIGS. 4A, 4B and 4C illustrate methods for displaying an image having a 16:9 aspect ratio on a display having a 4:3 aspect ratio.
Figure 4B:
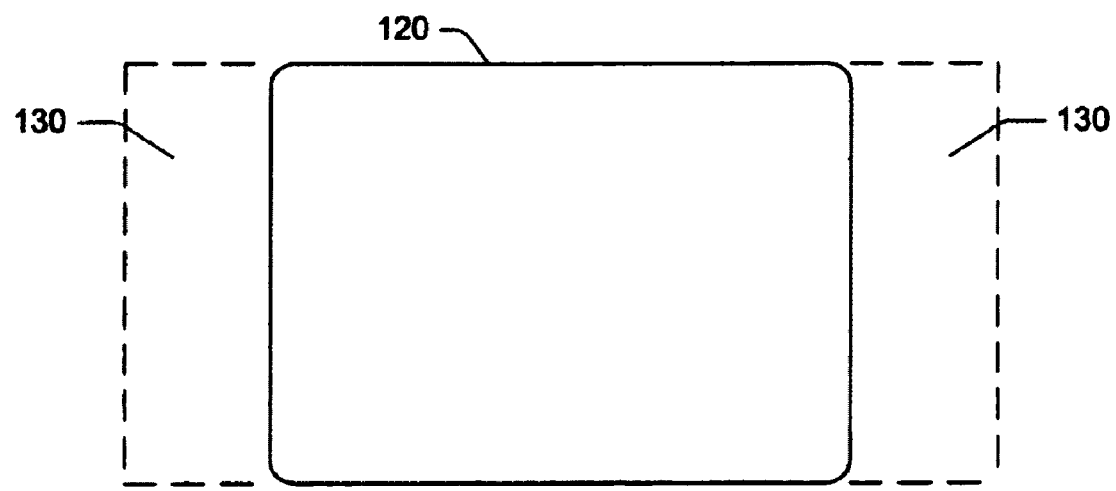
Figure 4C:
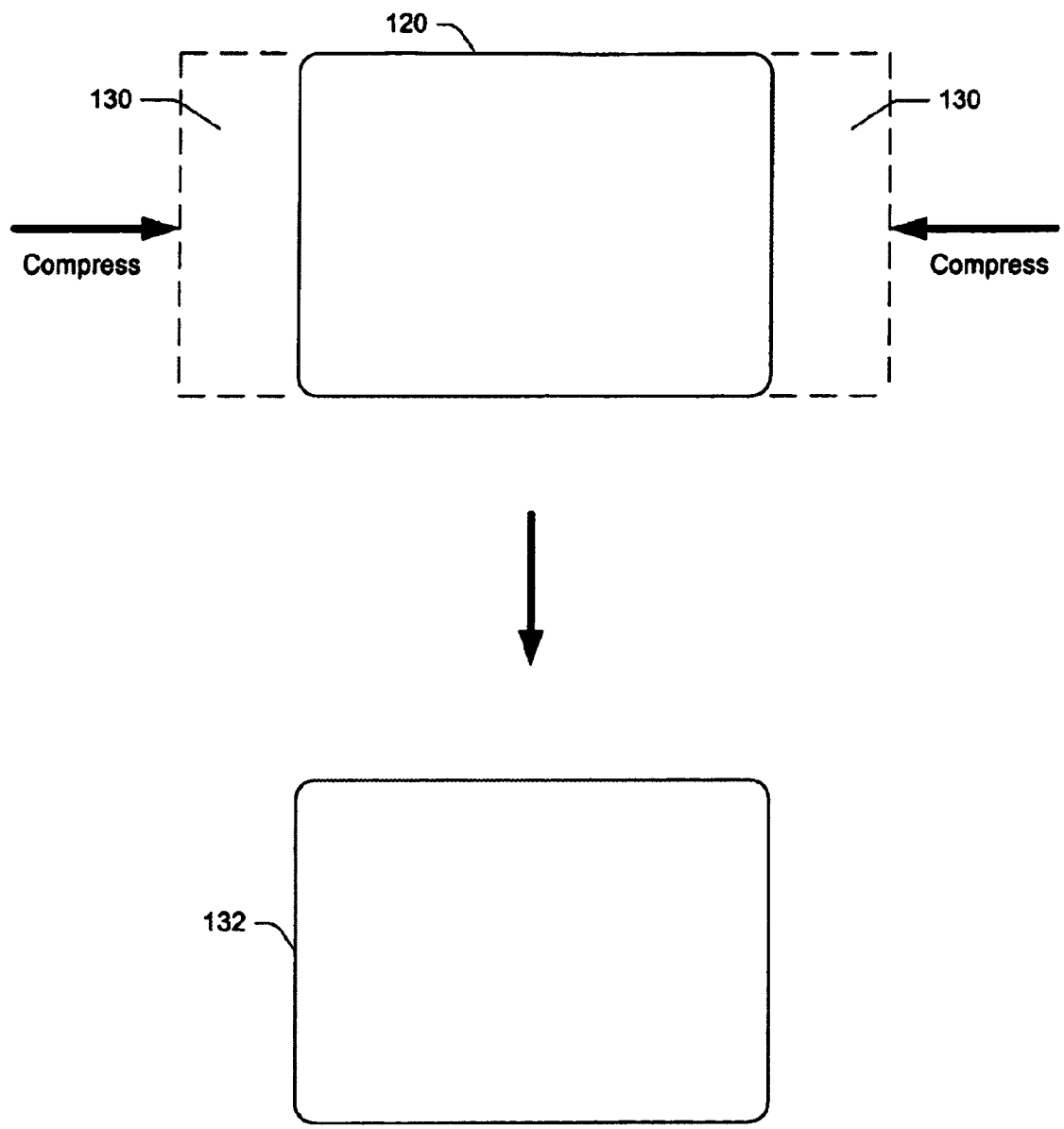
Figure 10:
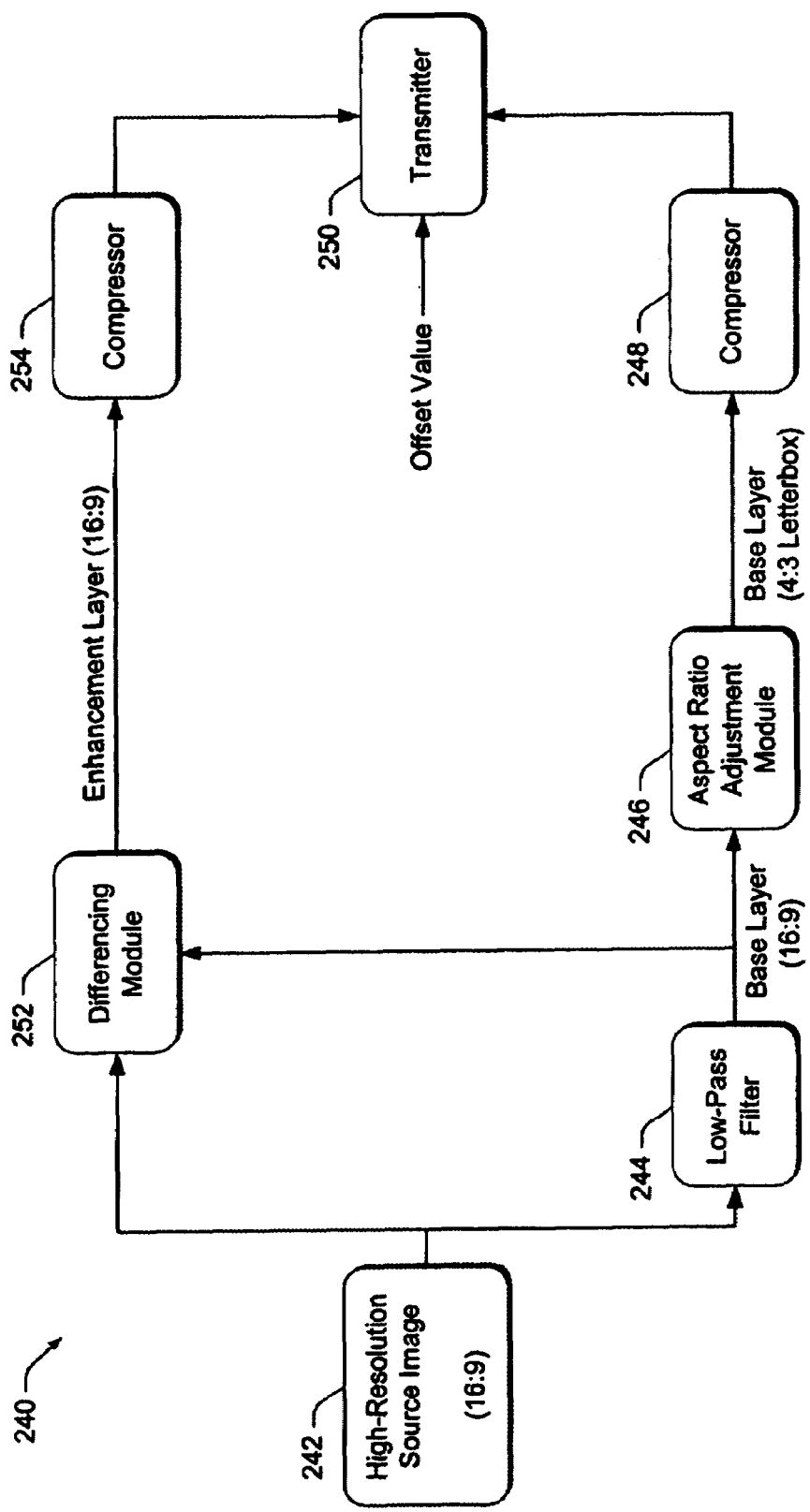
FIG. 10 illustrates another embodiment of a layered encoding system that separates a 16:9 high-resolution image into a base layer having a 4:3 aspect ratio and an enhancement layer having a 16:9 aspect ratio.

FIG. 10 illustrates another embodiment of a layered encoding system 240 that separates a 16:9 high-resolution image into a base layer having a 4:3 aspect ratio and an enhancement layer having a 16:9 aspect ratio. System 240 is similar to the layered encoding system 140 discussed above with reference to FIG. 5, but is used to process a 16:9 high-resolution source image 242 instead of the 4:3 high-resolution source image 142. Since the aspect ratio of the source image (16:9) is different than the aspect ratio of conventional low-resolution television systems (4:3), the source image is displayed on low-resolution televisions in letterbox format or with the anamorphic squeeze. An example of the letterbox format is shown above in FIG. 4A, in which the 16:9 image is vertically centered on the 4:3 display. The letterbox format generates two blank bands along the top and bottom of the screen (e.g., bands 124 in FIG. 4A). An example of the anamorphically squeezed format is shown in FIG. 4C, in which the 16:9 image is compressed laterally to fit within the boundaries of the 4:3 display.

The high-resolution 16:9 source image 242 is captured using a video camera, a film telecine or other device capable of capturing an image in a 16:9 aspect ratio. The source image 242 is communicated to a low-pass filter 244 and a differencing module 252. Low-pass filter 244 filters out the high-resolution portions of the source image 242, leaving the low-resolution portions of the image (i.e., the base layer). The base layer has the same aspect ratio (16:9) as the source image 242. The low pass filter 244 is coupled to an aspect ratio adjustment module 246, which changes the aspect ratio of the 16:9 base layer to a 4:3 aspect ratio in a letterbox or anamorphically squeezed format. The letterbox change is accomplished by adding a "padded" area to the top and bottom of the 16:9 base layer. The "padded" area corresponds to the two blank bands which are included in the letterbox format. A vertical offset value is used by the adjustment module 246 to determine the height of the top padded area. Any remaining screen area below the letterbox image is also padded. After adding this "padded" area to the 16:9 base layer, the aspect ratio of the resulting base layer is 4:3 (letterbox format), which can be displayed by a conventional 4:3 low-resolution television system. The anamorphic squeeze procedure is accomplished by changing the horizontal dimension of the 16:9 image to a smaller value, while keeping the vertical value the same.

The aspect ratio adjustment module 246 is coupled to a compressor 248. Compressor 248 compresses the 4:3 base layer and communicates the compressed data to a transmitter 250 coupled to the compressor 248. Transmitter 250 transmits the compressed base layer information to one or more receiving devices.

As previously mentioned, the source image 242 is provided to the differencing module 252. Additionally, the differencing module 252 receives the 16:9 low-resolution base layer from the low-pass filter 244. The differencing module 252 determines the differences between the 16:9 low-resolution base layer and the 16:9 high-resolution image received as the source image 242. The difference between the two 16:9 images can be determined, for example, by subtracting the low-resolution base layer from the high-resolution source image. The difference between the two images is the enhancement layer (i.e., only the high-resolution portions of the source image). The enhancement layer is used in combination with the base layer to recreate the original high-resolution source image 242. Alternatively, the enhancement layer can be generated by passing the high-resolution source image 242 through a high-pass filter. The portions of the source image that are not removed by the filter represent the enhancement layer.

A compressor 254 is coupled to differencing module 252. The compressor 254 receives and compresses the enhancement layer and provides the compressed data to the transmitter 250. Transmitter 250 also receives an optional offset value or anamorphic squeeze parameter that is transmitted along with the base layer and the enhancement layer. The offset value is required by the receiving devices (not shown) to properly decode and recreate the original high-resolution source image 242. The transmitter 250 combines the base layer, the enhancement layer, and the optional offset value or anamorphic squeeze parameter into a single transport stream. As discussed above with respect to FIG. 5, header information is added to the transport stream to identify the data elements (e.g., data packets) contained in the stream.

Figure 11:
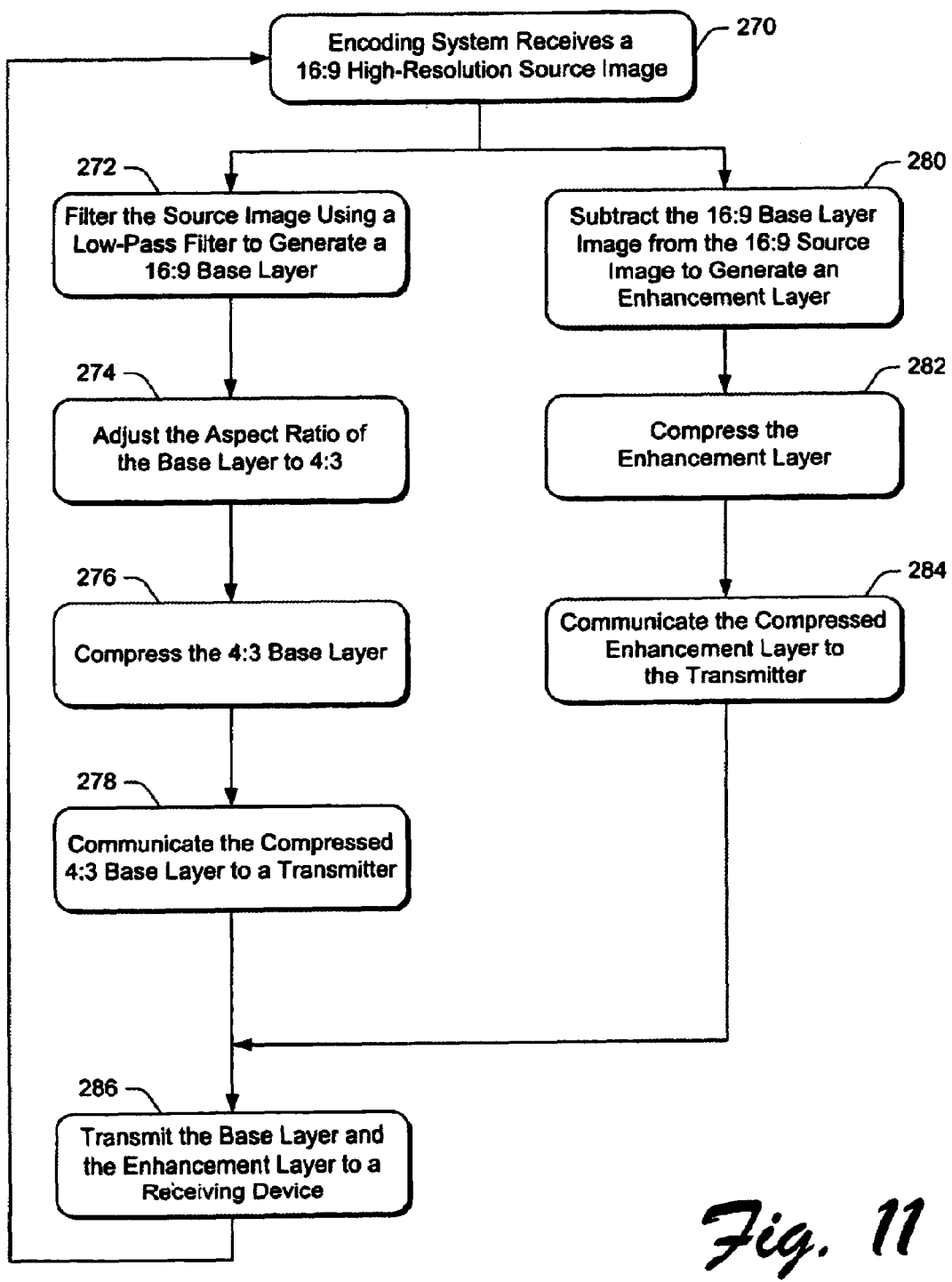
FIG. 11 is a flow diagram illustrating another layered encoding procedure.

FIG. 11 is a flow diagram illustrating another layered encoding procedure using, for example, the layered encoding system 240 described above in reference to FIG. 10. The encoding system receives a series of 16:9 high-resolution source images. Each source image is processed using the procedure of FIG. 11. The encoding system receives a 16:9 high-resolution source image (step 270). The flow diagram branches from step 270 into two parallel paths that are processed concurrently. Following the left path of FIG. 11, the source image is filtered using a low-pass filter to generate a 16:9 base layer (step 272). The 16:9 base layer is adjusted to a 4:3 format by padding the top and/or bottom of the 16:9 image, or by making an anamorphic squeeze as discussed above (step 274). The 4:3 base layer is then compressed (step 276) and communicated to a transmitter (step 278).

Following the right path of FIG. 11, the 16:9 base layer image is subtracted from the 16:9 source image to generate an enhancement layer (step 280). The enhancement layer is then compressed (step 282) and communicated to a transmitter (step 284). The left and right paths of FIG. 11 converge at step 286, which multiplexes and transmits the base layer and the enhancement layer to a receiving device. The transmitter may also transmit an offset value along with the base layer and the enhancement layer in a single transport stream.

A layered decoding system similar to the system described above with reference to FIG. 8 can be used to decode the data stream generated by the layered encoding system described above in FIG. 10 and FIG. 11.

Figure 12:
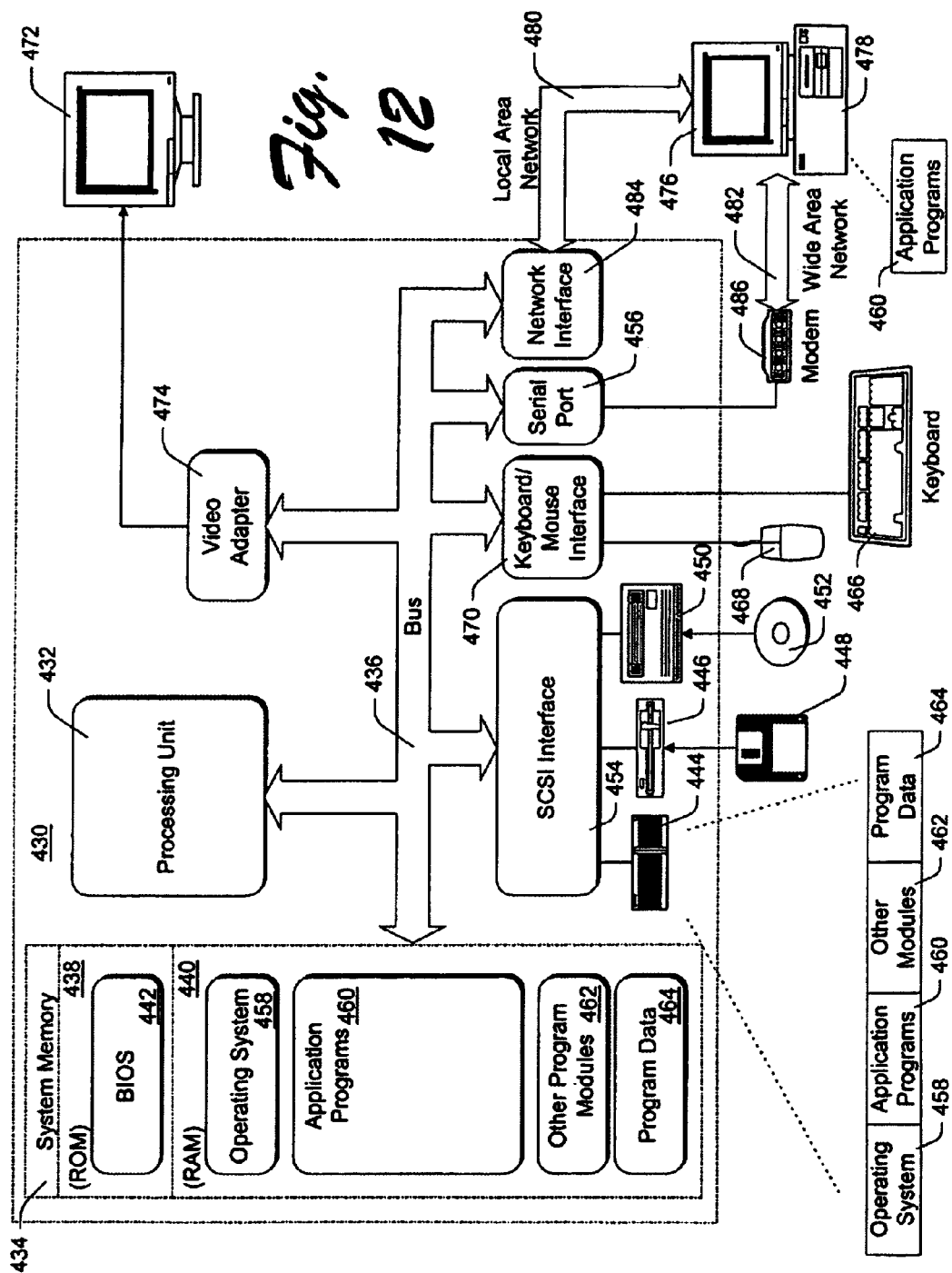
FIG. 12 is a block diagram showing pertinent components of a computer in accordance with the invention.

FIG. 12 shows a general example of a computer 430 that can be used with the present invention. A computer such as that shown in FIG. 12 can be used, for example, to perform various procedures necessary to encode or decode images, to store image data for later retrieval, or to display images on a display device coupled to the computer.

Computer 430 includes one or more processors or processing units 432, a system memory 434, and a bus 436 that couples various system components including the system memory 434 to processors 432. The bus 436 represents one or more of any of several types of bus structures, including a memory bus or memory controller, a peripheral bus, an accelerated graphics port, and a processor or local bus using any of a variety of bus architectures. The system memory 434 includes read only memory (ROM) 438 and random access memory (RAM) 440. A basic input/output system (BIOS) 442, containing the basic routines that help to transfer information between elements within computer 430, such as during start-up, is stored in ROM 438.

Computer 430 further includes a hard disk drive 444 for reading from and writing to a hard disk (not shown), a magnetic disk drive 446 for reading from and writing to a removable magnetic disk 448, and an optical disk drive 450 for reading from or writing to a removable optical disk 452 such as a CD ROM or other optical media. The hard disk drive 444, magnetic disk drive 446, and optical disk drive 450 are connected to the bus 436 by an SCSI interface 454 or some other appropriate interface. The drives and their associated computer-readable media provide nonvolatile storage of computer-readable instructions, data structures, program modules and other data for computer 430. Although the exemplary environment described herein employs a hard disk, a removable magnetic disk 448 and a removable optical disk 452, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 444, magnetic disk 448, optical disk 452, ROM 438, or RAM 440, including an operating system 458, one or more application programs 460, other program modules 462, and program data 464. A user may enter commands and information into computer 430 through input devices such as a keyboard 466 and a pointing device 468. Other input devices (not shown) may include a microphone, joystick, game pad, satellite dish, scanner, or the like. These and other input devices are connected to the processing unit 432 through an interface 470 that is coupled to the bus 436. A monitor 472 or other type of display device is also connected to the bus 436 via an interface, such as a video adapter 474. In addition to the monitor, personal computers typically include other peripheral output devices (not shown) such as speakers and printers.

Computer 430 commonly operates in a networked environment using logical connections to one or more remote computers, such as a remote computer 476. The remote computer 476 may be another personal computer, a server, a router, a network PC, a peer device or other common network node, and typically includes many or all of the elements described above relative to computer 430, although only a memory storage device 478 has been illustrated in FIG. 12. The logical connections depicted in FIG. 12 include a local area network (LAN) 480 and a wide area network (WAN) 482. Such networking environments are commonplace in offices, enterprise-wide computer networks, intranets, and the Internet.

When used in a LAN networking environment, computer 430 is connected to the local network 480 through a network interface or adapter 484. When used in a WAN networking environment, computer 430 typically includes a modem 486 or other means for establishing communications over the wide area network 482, such as the Internet. The modem 486, which may be internal or external, is connected to the bus 436 via a serial port interface 456. In a networked environment, program modules depicted relative to the personal computer 430, or portions thereof, may be stored in the remote memory storage device. It will be appreciated that the network connections shown are exemplary and other means of establishing a communications link between the computers may be used.

Generally, the data processors of computer 430 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention can be implemented in hardware or a combination of hardware, software, and/or firmware. For example, one or more application specific integrated circuits (ASICs) could be programmed to carry out the invention.

As discussed above, a particular embodiment transmits the base layer at a 4:3 aspect ratio and transmits the enhancement layer at a 16:9 aspect ratio. A 4:3 aspect ratio corresponds to a resolution of 640×480 (i.e., 640 vertical columns and 480 horizontal lines). Similarly, a 16:9 aspect ratio corresponds to a resolution of 1280×720 (1280 vertical columns and 720 horizontal lines). Both of these resolutions (640×480 and 1280×720) are supported by the Advanced Television Systems Committee (ATSC) Digital Television Standard (Doc. A/53, 16 September 1995). Therefore, both the base layer resolution and the enhancement layer resolution conform to the guidelines set forth in the ATSC Digital Television Standard.

Thus, a system has been described that provides a layered encoding system that separates a high-resolution source image into a base layer having an aspect ratio similar to that of low-resolution television systems and an enhancement layer having an aspect ratio similar to the aspect ratio of high-resolution television systems. In a particular application, this layered encoding system helps bridge the transition from low-resolution 4:3 aspect ratio televisions to high-resolution 16:9 aspect ratio televisions by supporting both types of televisions simultaneously.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of encoding a high-resolution source image having a first aspect ratio, the method comprising:
   generating a base layer representing a low-resolution portion of the source image, wherein the base layer has the first aspect ratio; and
   generating an enhancement layer representing a high-resolution portion of the source image, wherein the enhancement layer has a second aspect ratio, and wherein the second aspect ratio differs from the first aspect ratio.

2. A method as recited in claim 1 wherein the first aspect ratio corresponds to an aspect ratio associated with low-resolution televisions.

3. A method as recited in claim 1 wherein the second aspect ratio corresponds to an aspect ratio associated with high-resolution televisions.

4. A method as recited in claim 1 wherein the first aspect ratio is 4:3.

5. A method as recited in claim 1 wherein the second aspect ratio is 16:9.

6. A method as recited in claim 1 wherein the step of generating a base layer includes low-pass filtering the source image.

7. A method as recited in claim 1 wherein the step of generating an enhancement layer includes subtracting a portion of the base layer from a corresponding portion of the source image.

8. A method as recited in claim 1 wherein the step of generating an enhancement layer comprises:
   determining an offset value;
   extracting a first image from the base layer based on the offset value, wherein the first image has the second aspect ratio, and wherein the first image is less than the entire image represented by the base layer;

extracting a second image from the source image based on the offset value, wherein the second image also has the second aspect ratio, and wherein the second image is less than the entire image represented by the source image; and subtracting the first image from the second image.

9. A method as recited in claim 8, wherein the offset value indicates a vertical location from which the first image is extracted from the base layer.

10. A method as recited in claim 8, wherein the offset value indicates a horizontal location from which the first image is extracted from the base layer.

11. A method as recited in claim 1 wherein the step of generating an enhancement layer includes high-pass filtering the source image.

12. A method as recited in claim 1 further including combining the base layer and the enhancement layer into a single transport stream.

13. A method as recited in claim 1 further including transmitting the base layer and the enhancement layer to an image decoding system.

14. A method as recited in claim 1 further including transmitting only the base layer to an image decoding system.

15. A method as recited in claim 1 further including transmitting the base layer to an image decoding system using a first transmission medium and transmitting the enhancement layer to the image decoding system using a second transmission medium.

16. A method as recited in claim 1 further including transmitting the base layer to an image decoding system using a first transmission format and transmitting the enhancement layer to the image decoding system using a second transmission format.

17. A method as recited in claim 1 further including storing the base layer and the enhancement layer on a storage medium.

18. A method as recited in claim 1 further including storing the base layer on a first storage medium and storing the enhancement layer on a second storage medium.

19. One or more computer-readable memories containing a computer program that is executable by a processor to perform the method recited in claim 1.

20. A method as recited in claim 1 wherein both the base layer and the enhancement layer are used to generate a high-resolution image.

21. A method as recited in claim 1 wherein the enhancement layer contains only a high-resolution portion of the source image.

22. A method comprising:
decoding a base layer representing a low-resolution portion of an encoded source image, wherein the base layer and the source image have a first aspect ratio; and
decoding an enhancement layer representing a high-resolution portion of the encoded source image, wherein the second layer has a second aspect ratio, and wherein the second aspect ratio differs from the first aspect ratio.

23. A method as recited in claim 22 wherein the aspect ratio associated with the base layer corresponds to an aspect ratio associated with low-resolution televisions.

24. A method as recited in claim 22 wherein the aspect ratio associated with the enhancement layer corresponds to an aspect ratio associated with high-resolution televisions.

25. A method as recited in claim 22 wherein the aspect ratio associated with the base layer is 4:3.

26. A method as recited in claim 22 wherein the aspect ratio associated with the enhancement layer is 16:9.

27. A method as recited in claim 22 further including communicating the base layer to a low-resolution television.

28. A method as recited in claim 22 further including combining the enhancement layer and a portion of the base layer to generate high-resolution image data.

29. A method as recited in claim 22 wherein the method is executed by a television.

30. A method as recited in claim 22 wherein the base layer is decoded from a physical medium and the enhancement layer is decoded from a received data stream.

31. A method as recited in claim 22 further including correcting an anamorphic squeeze in the base layer.

32. A method as recited in claim 22 wherein the base layer is received at a first time and the enhancement layer is received at a second time.

33. A method as recited in claim 22 wherein the base layer is received from a first media and the enhancement layer is received from a second media.

34. One or more computer-readable memories containing a computer program that is executable by a processor to perform the method recited in claim 22.

35. A method as recited in claim 22 wherein both the base layer and the enhancement layer are used to generate high-resolution image data.

36. A method as recited in claim 22 wherein the enhancement layer contains only high-resolution image data.

37. A method comprising:
transmitting a base layer representing a low-resolution portion of an image, wherein the base layer and the image have a first aspect ratio; and
transmitting an enhancement layer representing a high-resolution portion of the image, wherein the enhancement layer has a second aspect ratio, and wherein the second aspect ratio differs from the first aspect ratio.

38. A method as recited in claim 37 wherein the first aspect ratio corresponds to an aspect ratio associated with low-resolution televisions.

39. A method as recited in claim 37 wherein the second aspect ratio corresponds to an aspect ratio associated with high-resolution televisions.

40. A method as recited in claim 37 wherein the base layer is transmitted using a first transmission medium and the enhancement layer is transmitted using a second transmission medium.

41. A method as recited in claim 37 wherein the base layer is transmitted using a first transmission format and the enhancement layer is transmitted using a second transmission format.

42. One or more computer-readable memories containing a computer program that is executable by a processor to perform the method recited in claim 37.

43. A method as recited in claim 37 wherein both the base layer and the enhancement layer are used to generate high-resolution image data.

44. An apparatus comprising;
a base layer generator to generate a base layer having a first aspect ratio, wherein the base layer represents a low-resolution portion of an image, and wherein the image also has the first aspect ratio; and
an enhancement layer generator coupled to the base layer generator to generate an enhancement layer having a second aspect ratio, wherein the enhancement layer represents a high-resolution portion of the image, and wherein the first aspect ratio differs from the second aspect ratio.

45. An apparatus as recited in claim 44 wherein the base layer generator is a low-pass filter.

46. An apparatus as recited in claim 44 wherein the enhancement layer generator is a high-pass filter.

47. An apparatus as recited in claim 44 wherein the enhancement layer generator includes an image extractor to extract a portion of the base layer and a differencing module to subtract the extracted portion of the base layer from a corresponding portion of the image.

48. An apparatus as recited in claim 44 further including a transmitter coupled to the base layer generator and the enhancement layer generator, wherein the transmitter combines the base layer and the enhancement layer into a single transport stream.

49. An apparatus as recited in claim 44 further including a transmitter coupled to the base layer generator and the enhancement layer generator, wherein the transmitter transmits the base layer and the enhancement layer to an image decoding system.

50. An apparatus as recited in claim 44 further including a transmitter coupled to the base layer generator, wherein the transmitter transmits only the base layer to an image decoding system.

51. An apparatus as recited in claim 44 further including a storage medium coupled to the base layer generator and the enhancement layer generator, wherein the storage medium stores the base layer and the enhancement layer.

52. An apparatus comprising:
a base layer decoder to decode a base layer representing a low-resolution portion of an image, wherein the base layer and the image have a first aspect ratio; and
an enhancement layer decoder coupled to the base layer decoder to decode an enhancement layer representing a high-resolution portion of the image, wherein the enhancement layer has a second aspect ratio that differs from the first aspect ratio.

53. An apparatus as recited in claim 52 wherein the first aspect ratio corresponds to an aspect ratio associated with low-resolution televisions.

54. An apparatus as recited in claim 52 wherein the second aspect ratio corresponds to an aspect ratio associated with high-resolution televisions.

55. An apparatus as recited in claim 52 wherein the apparatus is a television.

56. An apparatus as recited in claim 52 further including a receiver coupled to the base layer decoder and the enhancement layer decoder, wherein the receiver is to receive a transport stream containing the base layer and the enhancement layer.

57. A method as recited in claim 52 wherein both the base layer and the enhancement layer are used to generate high-resolution image data.

58. One or more computer-readable media having stored thereon a computer program comprising the following steps:
generating a base layer representing a low-resolution portion of a source image, wherein the layer and the source image have a first aspect ratio; and
generating an enhancement layer representing a high-resolution portion of the source image, wherein the enhancement layer has a second aspect ratio, and wherein the second aspect ratio is different from the first aspect ratio.

59. One or more computer-readable media as recited in claim 58 wherein the first aspect ratio is 4:3.

60. One or more computer-readable media as recited in claim 58 wherein the second aspect ratio is 16:9.

61. One or more computer-readable media as recited in claim 58 wherein the step of generating an enhancements layer includes comparing a portion of the base layer with a corresponding portion of the source image.

62. One or more computer-readable media as recited in claim 58 further including transmitting the base layer and the enhancement layer to an image decoding system.

63. One or more computer-readable media as recited in claim 58 further including transmitting only the base layer to an image decoding system.

64. One or more computer-readable media as recited in claim 58 further including storing the base layer on a storage medium.

65. One or more computer-readable media as recited in claim 58 further including storing the enhancement layer on a storage medium.

66. One or more computer-readable media having stored thereon a computer program comprising the following steps:
decoding a base layer representing a low-resolution portion of an encoded source image, wherein the base layer and the source image have a first aspect ratio; and
decoding an enhancement layer representing a high-resolution portion of the encoded source image, wherein the enhancement layer has a second aspect ratio, and wherein the first aspect ratio is different from the second aspect ratio.

67. One or more computer-readable media as recited in claim 66 wherein the first aspect ratio is 4:3.

68. One or more computer-readable media as recited in claim 66 wherein the second aspect ratio Is 16:9.

69. One or more computer-readable media as recited in claim 66 further including communicating the base layer to a low-resolution television.

70. One or more computer-readable media as recited in claim 66 further including communicating the base layer and the enhancement layer to a high-resolution television.

71. A method of encoding a source image having a first aspect ratio, the method comprising:
generating a base layer representing a low-resolution portion of the source image, wherein the base layer has the first aspect ratio; and
generating an enhancement layer representing a high-resolution portion of the source image, wherein the enhancement layer has second aspect ratio, wherein the second aspect ratio differs from the first aspect ratio, and wherein both the base layer and the enhancement layer are used to generate a high-resolution image.

72. A method as recited in claim 71 wherein the first aspect ratio corresponds to an aspect ratio associated with low-resolution televisions.

73. A method as recited in claim 71 wherein the second aspect ratio corresponds to an aspect ratio associated with high-resolution televisions.

74. A method comprising:
decoding a first layer representing a low-resolution portion of an encoded source image, wherein the first layer and the source image have associated first aspect ratio;
decoding a second layer representing a high-resolution portion of the encoded source image, wherein the second layer has an associated second aspect ratio, and wherein the second aspect ratio differs from the first aspect ratio; and
combining the second layer and the first layer to generate high-resolution image data.

75. A method as recited in claim 74 further comprising communicating the first layer to a low-resolution television.

76. A method as recited in claim 74 further comprising communicating the high-resolution image data to a high-resolution television.

* * * * *

UNITED STATES PATENT AND TRADEMARK OFFICE
CERTIFICATE OF CORRECTION

PATENT NO. : 7,020,195 B1  
APPLICATION NO. : 09/458300  
DATED : March 28, 2006  
INVENTOR(S) : Thomas L. McMahon Page 1 of 1

It is certified that error appears in the above-identified patent and that said Letters Patent is hereby corrected as shown below:

On the title page, item (56), under "U.S. Patent Documents", in column 1, line 4,  
below "5,510,787 A * 4/1996 Koster 341/76"  
insert -- 5,537,157 7/1996 Washino et al. --.

On the title page, item (56), under "Other Publications", in column 2, line 1, delete "et al," and insert -- et al., --, therefor.

On the title page, item (56), under "Other Publications", in column 2, line 2, below "Morrison et al, Two-layer video coding for ATM networks, 1991, Elsevier Science Publishers, 179-195.*"  
insert -- Demos, Gary; "Temporal and Resolution Layering in Advanced Television," Nov. 27, 1999, 22 pages.  
"ATSC Digital Television Standard," Advanced Television Systems Committee, Sept. 16, 1995, 74 pages. --.

In column 17, line 50, in Claim 58, after "wherein the" insert -- base --.

In column 17, line 62, in Claim 61, delete "enhancements" and insert -- enhancement --, therefor.

In column 18, line 24, in Claim 68, after "ratio" delete "Is" and insert -- is --, therefor.

In column 18, line 38, in Claim 71, after "layer has" insert -- a --.

In column 18, line 52, in Claim 74, after "image have" insert -- an --.

Signed and Sealed this

Twenty-second Day of September, 2009

David J. Kappos  
*Director of the United States Patent and Trademark Office*